United States Patent [19]

Carlsson

[11] 3,918,223

[45] Nov. 11, 1975

[54] SECTIONAL STUD FOR MODULAR WALL SECTION

[75] Inventor: Sven A. Carlsson, Yonkers, N.Y.

[73] Assignee: Phelps Dodge Industries, Inc., New York, N.Y.

[22] Filed: June 3, 1974

[21] Appl. No.: 475,571

Related U.S. Application Data

[62] Division of Ser. No. 289,761, Sept. 15, 1972, abandoned.

[52] U.S. Cl. .......................... 52/221; 52/731; 174/48
[51] Int. Cl.² .......................................... E04B 5/48
[58] Field of Search ................. 52/221, 731; 174/48

[56] References Cited
UNITED STATES PATENTS

| 756,749 | 4/1904 | Walts, Jr. .............................. 52/221 |
| 2,260,178 | 10/1941 | Guignon, Jr. ..................... 52/221 X |
| 3,160,244 | 12/1964 | Kushner et al .................... 52/221 X |
| 3,160,245 | 12/1964 | Pavlecka ............................ 52/731 |
| 3,191,727 | 6/1965 | Schmeltz .......................... 49/DIG. 1 |
| 3,194,361 | 7/1965 | Thurman ............................. 174/48 |
| 3,377,756 | 4/1968 | Polhamus .......................... 52/731 X |
| 3,440,785 | 4/1969 | Denny et al. ...................... 52/426 X |
| 3,609,211 | 9/1971 | Van Herk .......................... 52/221 X |

FOREIGN PATENTS OR APPLICATIONS 264,087  8/1968  Austria ................................ 52/731

Primary Examiner—Alfred C. Perham
Attorney, Agent, or Firm—Harness, Dickey & Pierce

[57] ABSTRACT

A sectional stud for use in a modular building system to interconnect adjacent wall sections having inner and outer skin panels comprising a pair of spaced metal drive cleats fastened to an intermediate plastic member of tubular cross-section and adapted for interlocking connection with the skin panels of adjacent wall sections disposed in edgewise butting relation so as to rigidly interconnect the inner and outer skin panels of respective wall sections and to securely join the wall sections together. The drive cleats preferably are connected to the tubular member by flanges slidably interlockingly engaged in T-slots formed in circumferentially spaced, longitudinally extending, ribs on and disposed about the outer periphery of the tubular member. The tubular member may also be utilized for other purposes such as a conduit or chase for housing electrical conductors, and the slotted ribs also can be utilized for other purposes such as supporting an electrical receptacle box in a modular wall section.

19 Claims, 5 Drawing Figures

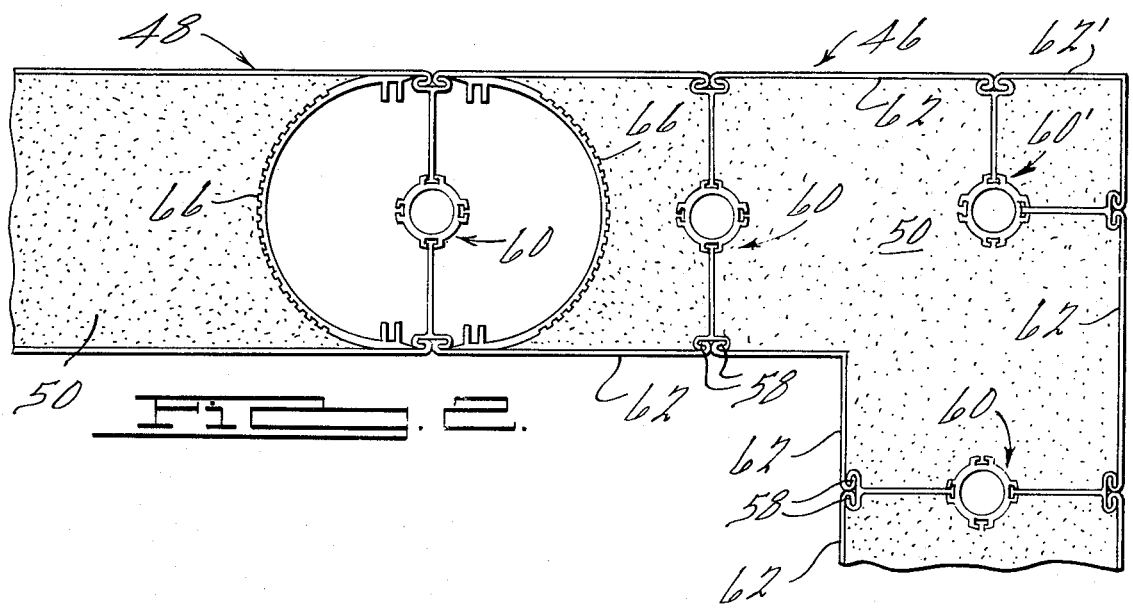
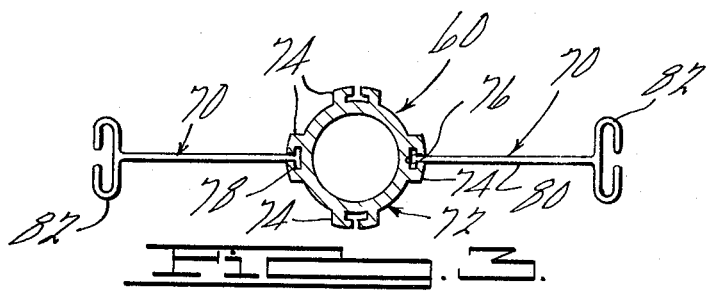
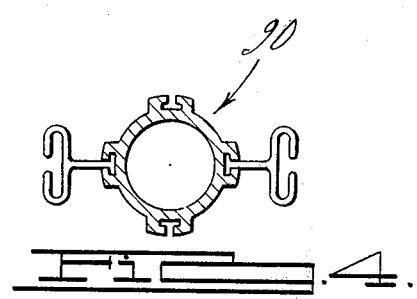
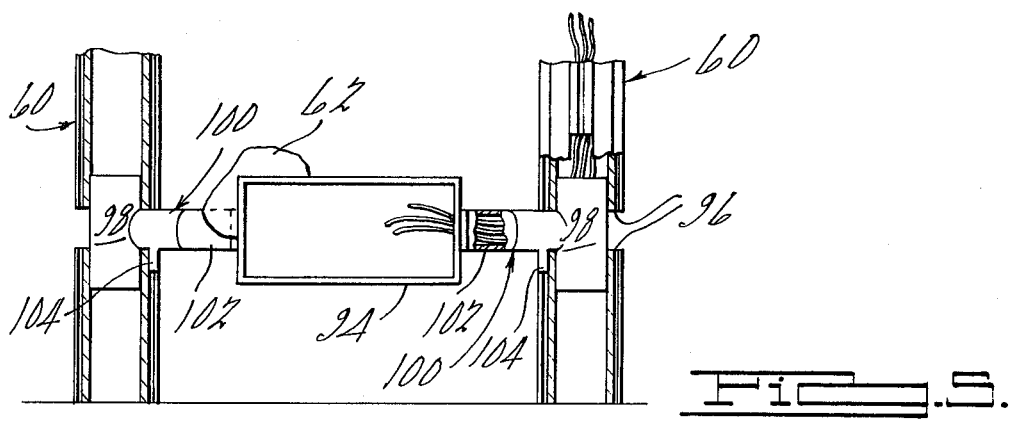

SECTIONAL STUD FOR MODULAR WALL SECTION

This is a division of application Ser. No. 289,761, filed Sept. 15, 1972, and now abandoned.

BACKGROUND AND SUMMARY OF THE INVENTION

The present invention relates generally to fastener devices and more particularly to an improved sectional stud for use in interconnecting adjacent wall sections of a modular building system.

Heretofore various stud or locking bar devices have been utilized in the assembly of modular building wall sections. Generally speaking, studs have previously been formed from both metal and plastic materials, and each has relative advantages and disadvantages. Metal studs, for example, have better load bearing and strength characteristics for supporting vertically imposed roof loads and for withstanding lateral wind loads whereas plastic studs have improved insulating properties to inhibit heat transfer across the stud and consequently through the building wall. In the subject invention, a sectional stud is provided having an intermediate, tubular, plastic member which functions as a thermal break or heat barrier, and the drive cleats are formed of a suitable metal such as aluminum to provide a stud having the inherent advantages of both the metal and plastic materials.

The sectional stud of the invention also assists materially in maintaining the structural integrity of the wall in the event of a fire. Plastic studs typically melt at approximately 200°F., and when this occurs they, of course, release the previously secured skins of the wall sections. Manifestly, release of the skins exposes the interior insulating cores of the wall sections to the fire and consequently permits an earlier destruction of the core. In the subject invention, the intermediate tubular members of the studs are located substantially midway between the inner and outer skin members of the wall sections and preferably are surrounded by, and embedded in the insulating cores of the sections so that they are not directly exposed to the fire or to temperatures that approximate or exceed the melting points of the material from which they are made. The drive cleats on the other hand have a typical melting point of about 1400°F., and therefore maintain the structural integrity of the wall much longer. At the same time, the tubular member provides an effective thermal barrier, even though one of the cleats is heated by a fire at one side of the wall.

In another aspect of the invention, as previously suggested, the tubular member can be utilized as a chase for electrical conductors, armoured cable, or the like. In addition to providing connections for the cleats, the slotted ribs of the chases can be utilized to attach connecting members of accessories such as receptacle or switch boxes to obviate certain problems encountered in prior building systems.

Other advantages of the present invention will become apparent from a consideration of the following detailed description and claims, taken in conjunction with the drawings.

BRIEF DESCRIPTION OF THE DRAWINGS

FIG. 2 is an enlarged, fragmentary plan view of the perimeter corner section of the building structure illustrated in FIG. 1;

FIG. 3 is a cross-sectional view of the preferred sectional stud of the subject invention;

FIG. 4 is another cross-sectional view of a preferred structural stud for connecting partition wall sections in accordance with the principles of the subject invention; and FIG. 5 is a fragmentary sectional view of an electrical receptacle box disposed between and attached to a pair of adjacent sectional studs also in accordance with the principles of the subject invention.

DETAILED DESCRIPTION OF THE PREFERRED EMBODIMENTS

Figure 1:
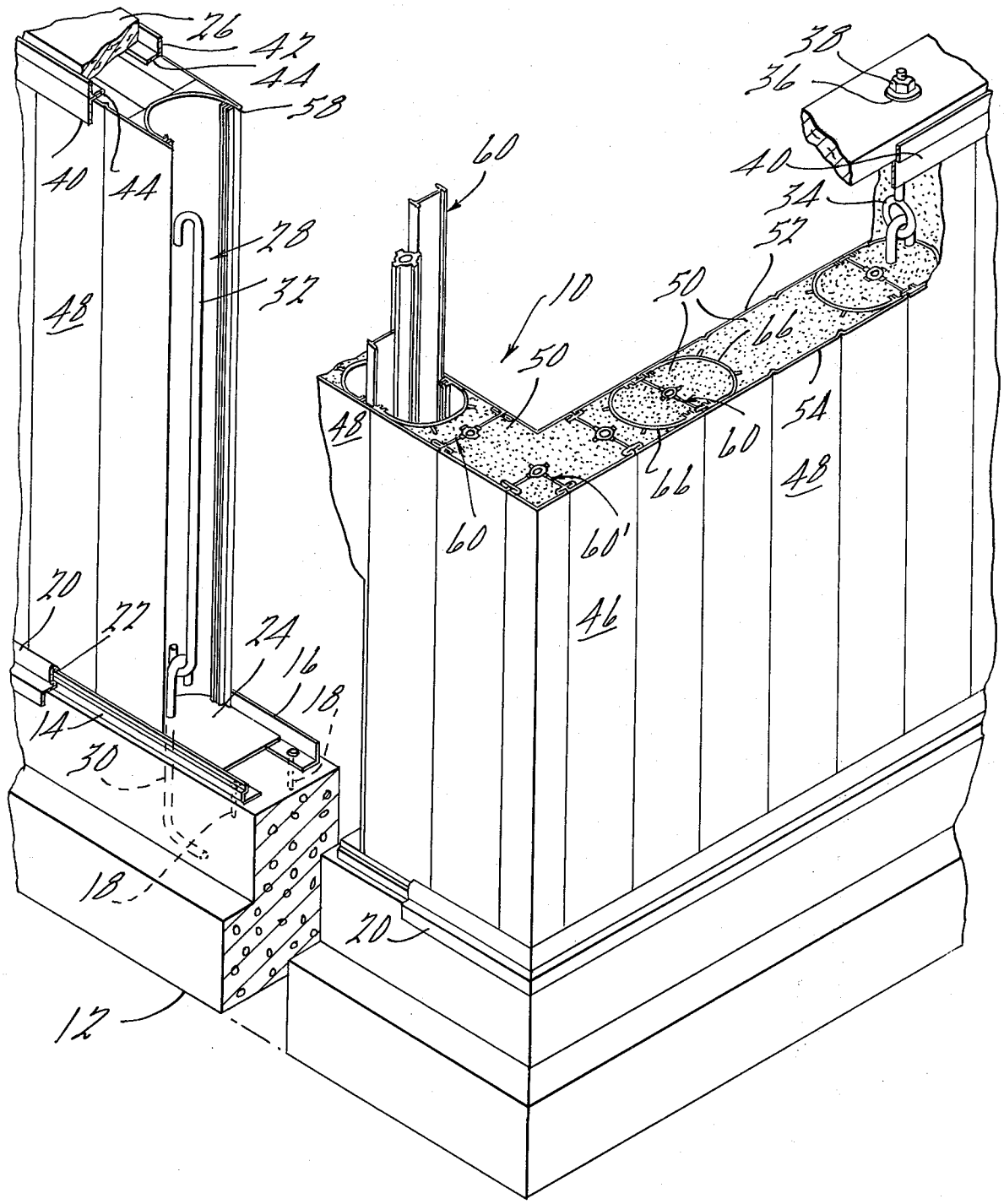
FIG. 1 is an exemplary, fragmentary, perspective view of a partial building structure having modular wall sections connected by sectional studs in accordance with the principles of the subject invention.

Generally speaking, the sectional stud of the subject invention is utilized in conjunction with a preferred modular wall system wherein each section of the wall comprises inner and outer skin panels, each having a rolled over outer edge forming a re-entrant flange adapted for interconnection with a sectional stud as shall be hereinafter described. Inner and outer skin panels joined at the side edges thereof by suitable dams or closures are prefabricated or preassembled in the factory into a modular wall section which is then filled with a suitable foam material to form a rigid, efficiently insulated, modular wall section. In some instances, larger or more complex wall sections can be factory assembled and formed utilizing two or more skin panels at each side connected by studs such as those hereinabove described. Further, the wall sections can be made of different thicknesses, a relatively thick one for perimeter wall construction and a relatively thin one for partition wall construction, Preferably, the factory formed sections are formed initially to a standard length, as for example 20 feet, and these sections are then cut to any suitable length to make a wall section which satisfies the specifications of the particular building in which it is to be used. Preferably, standard modular wall sections have a width of 24, 32, or 48 inches and a thickness of either 4 or 5 ⅛ inches, although they can, of course, be made to other dimensions. In some instances sub-modular wall sections of non-standard dimensions such as 26 ⅔ inches, 37 ⅓ inches, etc. are used to advantage. The standard and sub-modular wall sections greatly increase the design flexibility of the system, and permit versatility in the arrangement and location of doors, windows, corners, etc. Standard size windows and doors can be readily adapted to the standard wall sections hereinabove described and this permits almost unlimited flexibility in the design of the system.

The dams or closures at the sides of the wall sections leave the re-entrant side flanges of the skin panels exposed and free for attachment to the studs so that the modular wall sections can be erected and interconnected in the field simply by sliding studs into the spaces between adjacent sections with the cleat flanges engaged behind and interfitting with the skin flanges. After the wall is assembled, the cavities between adjacent wall sections in which the studs are mounted are filled in the field with a suitable foam material thus totally, completely, and permanently closing the joints between the sections. In the field, the modular system can be installed on a slab, on the foundation of a crawl space or a full basement or as an upper floor of a subwall using a base track adapted for receiving and anchoring the modular system. After the wall sections are assembled on the base track, a cap plate is superimposed on the upper edge of the assembly and bolted in place in any suitable way as by a threaded eye bolt and a steel anchor rod. The resulting structure is thereafter completed by construction of a roof in any suitable or conventional way.

With reference now to the drawings, a preferred exemplary modular building system indicated generally at 10 in FIG. 1, is illustrated in accordance with the subject invention. The system 10 is shown installed on a suitable concrete slab 12 although as suggested the slab 12 could be the foundation of a full basement, a crawl space, or the top edge of apreviously formed wall. A pair of angles 14 and 16 are shown affixed to the top surface of the slab 12 by a plurality of suitable fasteners 18, the angles 14 and 16 being suitably spaced in accordance with the thickness of the modular wall sections to receive and snugly fit the lower ends of the sections. The outer or exterior surfaces of the angles 14 and 16 preferably are covered by suitable trim members 20 having folded over upper marginal edge portions 22 which overlay the exposed edges of the angles. The system 10 preferably is sealed to the slab 12 by a suitable gasket 24 which rests on the slab between the angles 14 and 16; but it will be readily appreciated that any suitable sealing means can be used such as caulking compound, for example, that effectively prevents air and moisture from penetrating under the wall.

After the perimeter wall of the building system 10 has been assembled, a cap plate 26 is superimposed on the upper edge of the wall and fastened securely in some suitable way as by the anchor rod assembly 28. The assembly 28 here shown comprises a lower hook shaped member 30 embedded in the slab 12 between adjacent wall sections and an intermediate conncting rod 32 which is attached thereto and to an eye bolt 34 which extends upwardly therefrom through the cap plate 26. A nut 38 on the projecting threaded end of the eye bolt 34 is tightened against the washer 36 to hold the various parts of the anchor assembly under tension and securely together. First and second trim members 40 and 42 also preferably are provided at opposite sides of the plate 26. The trim members 40 here shown have lateral flanges 44 clamped between the plate 26 and the upper edge of the wall 10. The cap plate 26 also is used to support a roof super-structure (not shown) which can be attached thereto in any suitable or conventional way.

As viewed in FIG. 1, the modular building system 10 typically includes a modular corner section 46 connected to upright, adjacent, modular wall sections 48. Each of the wall sections 46 and 48 include an insulating core 50 (such as polyurethane foam) bonded to inner and outer skin members 52 and 54, respectively. The two skin members 52 and 54 preferably comprise preformed sheets of a suitable metal such as aluminum. The opposite longitudinal or side edges of the skin members 52 and 54 are formed with inwardly rolled re-entrant flanges 58 which are adapted to be interconnected to a similarly formed prefabricated corner section 46 or wall panel 48 by a sectional stud 60 according to the present invention to form a portion of a building wall. The studs 60 function similarly to join sections of building partitions.

In this regard and with particular reference to FIG. 2, it will be observed that the corner wall section 46 comprises a plurality of skin members 62 and 62' each having inwardly rolled re-entrant flanges 58 at the longitudinal marginal edges thereof. the left end of the corner section 46 as viewed in FIG. 2 includes an end dam 66 having tapered marginal edge portions disposed in opposite, inner and outer re-entrant flanges 58. As shown in FIG. 1, a second end dam 66 is similarly disposed at the other side edge of the corner section. The individual modular wall sections preferably are prefabricated by assembling the skin panels and studs in a forming fixture which includes means also for positioning and holding the end dams 66 with the side edges thereof behind the re-entrant flanges of the skin panels prior to introducing the material which forms the insulating core 50. After assembly of the above components in the fixture, an insulating foam material such as polyurethane is poured into the hollow interior of the wall section thus formed to bondingly unite with the sectional studs 60, the end dams 66, and the skin members 62. The process by which the modular sections are formed, the details of the end dams 66, and the outer skin members 62 form no part of the subject invention, but reference may be had to the copending application of Sven A. Carlsson, entitled "Modular Wall Section for Buildings", Ser. No. 281283, filed Sept. 8, 1972 now U.S. Pat. No. 3,828,502 for a complete disclosure of a preferred modular panel construction, the patent application being incorporated herein by reference.

In practice, the prefabricated wall and corner sections 48 and 46 are erected on the building site and interconnected by sectional studs 60 as illustrated in FIG. 1; and the spaces between the sections are then field foamed to fully embed the connecting studs and to form an essentially continuous monolithic insulating foam core in the wall.

FIG. 3 shows a cross-section of the sectional stud 60 of this invention as adapted for use in a perimeter or outside wall of a building. The stud 60 comprises a pair of similar drive cleats 70 and an intermediate tubular member 72 of PVC or other heat insulating material. The tubular member 72 is formed with a plurality of circumferentially equi-spaced, radially outwardly extending longitudinal ribs 74 each having an outwardly opening T-slot 76 adapted to receive and to slidably interfit with a complementary flange 78 on the inner edge of the web 80 of a drive cleat 70. The outer face of the flange 78 preferably is concavely arcuately formed to a radius equal to the outer radius of the tubular member 72. At the outer edge of the web 80 of each cleat 70 is a generally C-shaped, flange 82 which is adapted to engage behind the re-entrant flanges 58 of adjacent skin members 62 of a wall section to hold the skin members securely together in edgewise butting relation and to close the joint between the members as in the case of the corner wall section 46 previously described and illustrated in FIG. 2. The cleat 70, of course, also cooperates with the other members of the stud assembly to hold the outer skin members properly spaced with respect to the inner skin members and to hold the various parts of the wall section together in use and during foaming of the core 50. Alternatively, the cleat 70 is used to interfit with the reentrant flanges of adjacent wall sections to hold the latter aligned with each other and securely together in edgewise butting relation as illustrated in the left hand portion of FIG. 2. In the latter mode of use, the outer flanges of the cleat 70 share the space behind the re-entrant flanges of the skin panels together with the tapered marginal edge portions of the end dams 66 as previously suggested and as described in greater detail in the patent hereinabove specifically identified. In this environment, the cleat 70 also cooperates with the opposite cleat in the stud assembly to hold the position the intermediate tubular member 72 which functions as a thermal barrier between the two cleats and also serves as a chase for electrical conduits or in any other capacity in which it is or may be useful. Here again, of course, the two cleats in the stud assembly hold the adjacent wall sections together and properly in alignment during erection and construction of the building wall and during field foaming of the space occupied by the stud and between the confronting end dams of the sections. From the foregoing, it will be readily appreciated that the sectional stud assembly 60 necessarily has a width dimension between opposite flanges 82 corresponding to the perimeter wall thickness. The stud 60 preferably extends the full depth of the wall section in which it is used so that it serves a load supporting function. In this regard, one of the drive cleats 70 can be constructed of a relatively thicker or heavier material to increase the column strength of the stud 60. Also, if desired, the web portions 80 of the cleats 70 may have openings or perforations through which the foam core extends to assure a truly monolithic core structure within the wall.

As suggested, partition walls also are within the purview of the subject building system 10. In this regard reference is now had to FIG. 4 which shows a sectional stud 90 which is adapted for use in prefabricated partition wall sections and for use in connecting partition wall sections together. Except for having a lesser width dimension along the web, the sectional stud 90 is identical in construction and in use to the perimeter wall stud 60 previously described.

the studs 60 and 90 have numerous advantages over prior interlocking bar or integral stud arrangements. For example, the tubular element 72 can be utilized as a chase for running and locating electrical conductors. In some building applications, the length of the element 72 may be increased relative to the length of the drive cleats 70 to provide an access conduit between a basement, or sub-structure, and the roof superstructure. Another advantage resides in the fact that because the member 72 is constructed of a plastic material, it is a thermal barrier or insulator which inhibits heat or vapor transfer through the skin panel 62. In this regard it will be noted that the possibility of condensation forming on a surface of a panel which subsequently is subject to freezing, is virtually eliminated. In some systems, it as been found that the tightness of the interlocked sections 48 has been greatly reduced by forces applied against the skin due to the freezing of the condensation. Moreover, the drive cleats 70, which are constructed of metal, increase the load carrying capacity of the building walls both in supporting the vertical roof load and also for withstanding horizontally imposed wind loads. With respect to wind loads, the sectional construction of the stud 60 also permits, or facilitates, the assembly of the system 10. As will be appreciated, due to the surface area of the individual sections 48, it is most difficult to retain a section in edgewise butting relationship whereby to receive a one piece interlocking bar or stud due to the force applied thereagainst by the wind. In the subject system, a first section of the stud 60 comprising one drive cleat 70 and the tubular member 72 may be slidably engaged to connect a pair of adjacent marginal edges 58 on one side of the section 48. Because of the guiding now provided via the marginal edge connection, the opposite edges may be urged in edgewise butting relation whereby to receive the other drive cleat 70. Moreover, since the stud 60 or at least the second drive cleat must initially be positioned above the upper surface of a wall section to permit slidable engagement, the assembly is greatly simplified by initially downwardly engaging the second cleat a minimal distance such as a few feet and subsequently upwardly sliding the tubular member 72 and first drive cleat 70 to fully assemble the stud 60. The now fully assembled stud 60 is then slidably urged downwardly to complete the assembly.

In the event of a fire, it also will be noted that the stud assemblies 60 maintain the integrity of the wall system 10 longer than conventional wall structures. The fact that the tubular member 72 is disposed midway between the inner and outer skin panels 62 of the wall renders it less vulnerable to fire or other high temperature conditions outside the wall. The right angular relation of adjacent ribs 74 makes it possible to dispose the drive cleats 70 either opposite each other in the normal or usual way as shown at 60 in FIG. 2 or at right angles to each other for use in special situations as at corners of wall sections wherein this arrangement can be used to advantage to connect a corner skin member 62' to adjacent skin members 62 as shown at 60' in FIG. 2.

Another application of the sectional stud 60 of this invention is illustrated in FIG. 5 wherein two adjacent sectional studs 60 are specially adapted to carry an electrical receptacle box 94 in proper registration with a correspondingly sized opening in the skin panel 62. In this application, the receptacle box is attached to a Tee-shaped, tubular adapter 100 which defines an access conduit between the member 72 and the box 94, and which includes oppositely extending branch sections or arms 102 which terminate in transverse cylindrical inserts 98. The latter fit sngly in the bores of the tubular members 72 of the studs 60, the tubular members 72 being cut transversely as indicated generally at 96 to facilitate assembly. In this latter connection, it will be readily appreciated that, while the tubular members 72 are divided transversely to accommodate the inserts 98, the drive cleats 70 that connect the members 72 to the skin panels may well extend the full height of the wall as previously described to perform their full load supporting function. Keys 104 project downwardly from the arms 102 into T-shaped slots 76 of the members 72 to secure the members 100 against rotational or pivotal movement relative to the studs 60. The arm sections 100 preferably are outwardly angularly inclined and disposed by the insertion of the keys 104 into the slots 76 so that they serve to press the outer face of the receptacle box 94 against the skin panel 62 and to prevent the foam material from gaining access between the box and the skin panel 62 during foaming of the core in the space occupied by the box.

Alternatively, or additionally, if desired, a suitable adhesive or sealing compound can be used between the box 94 and the skin 62 to make sure that the foam does not escape from the wall section around the rceptacle. It will thus be seen that the T-slots 76 of the studs 60 have a variety of uses and it will be appreciated that the applications and uses illustrated and described herein are by way of example only. Other uses for the T-slots 76 are contemplated and can include the suitable locating and supporting of other ancillary support members or the like utilized in the system 10.

While the preferred embodiments of the sectional stud illustrated herein are well calculated to fulfill the objects and advantages above stated, it will be appreciated that the present invention is susceptible to modification, variation, and change without departing from the scope of the invention.

What is claimed is:

1. A preformed wall section for use in a modular building system, said wall section having inner and outer skin panels formed with opposed inwardly rolled, re-entrant flanges, an electrical receptacle box disposed behind an opening formed in one of said skin panels, a pair of spaced sectional studs including drive cleat means interlockingly connecting adjacent re-entrant flanges of said skin panels, tubular chase members supporting said drive cleat means; and adapter means connected to said receptacle box and to the chase members of said studs holding said box in register with the opening in said skin panel.

2. The wall section as recited in claim 1 wherein said chase members include longitudinal slots therein, and wherein said adapter means includes keys extending into said slots operative to hold said adapter and said receptacle box in a predetermined angular position with respect to said chase members.

3. The wall sections as recited in claim 2 wherein said adapter means is provided with arm portions between said receptacle box and said chase members, and wherein engagement of said keys in said slots holds said arms flexed to press said receptacle box against said skin panel at said skin opening.

4. The wall section as recited in claim 3 wherein said adapter means is provided with inserts disposed at the ends of said arm portions in the bores of said chase members and holding said adapter means securely attached to said chase members.

5. A wall section for a modular building system comprising opposed wall portions;

stud means disposed between and connected to said wall portions holding the latter in spaced apart relation, said stud means having at least one longitudinal integral chase portion adapted to receive and house a utility such as electrical wiring and the like, said chase portion being provided with an inlet adapted to accept said utility and through which said utility can be introduced into said chase and an outlet remote from said inlet adapted to accept said utility and through which said utility can be exited from said chase for connection with a part of said system remote from said stud means;

a fitting disposed laterally with respects to and intermediate the ends of said chase;

interconnecting means extending between said chase and said fitting supporting said fitting and having a passage therein communicating with said chase through said lateral opening and with said fitting, said interconnecting means forming a way through which said utility is adapted to pass from said chase into said fitting.

6. The combination as set forth in claim 5 wherein said interconnecting means comprises an adapter having a terminal portion connected to said chase at said outlet, and wherein said passage extends through said terminal portion and said outlet to accept said utility at its point of exit from said chase.

7. A wall section for a modular building system comprising opposed wall portions;

stud means disposed between and connected to said wall portions holding the latter in spaced apart relation, said stud means having at least one longitudinal integral chase portion adapted to receive and house a utility such as electrical wiring and the like, said chase portion being provided with an inlet adapted to accept said utility and through which said utility can be introduced into said chase and an outlet remote from said inlet adapted to accept said utility and through which said utility can be exited from said chase for connection with a part of said system remote from said stud means;

a fitting disposed laterally with respect to and intermediate the ends of said chase;

interconnecting means extending between said chase and said fitting supporting said fitting and having a passage therein communicating with said chase through said lateral opening and with said fitting, said interconnecting means forming a way through which said utility is adapted to pass from said chase into said fitting;

said interconnecting means comprising an adapter and including means for angularly adjusting said adapter about said chase and for interlockingly connecting said adapter to said chase to dispose the latter in a selected angularly adjusted position relative to said chase, whereby a selected angular adjustment of said adapter exerts pressure on said fitting through said connecting means to hold the fitting pressed against one of said wall portions.

8. The combination as set forth in claim 7 wherein said adapter extends through the lateral opening in said chase and wherein said adapter includes a terminal portion journaled in and confined by said chase for limited angular movement relative thereto.

9. The combination as set forth in claim 7 wherein said chase is formed in separate upper and lower parts the adjacent ends of which define said lateral opening, wherein said adapter extends between the mentioned ends of said chase, and wherein said adapter is provided with a terminal portion in and confined by the upper and lower parts of said chase; and key and slot means coacting between said adapter and at the least one of the mentioned parts of said chase for holding said adapter in said selected angularly adjusted position and said fitting in pressed engagement with one of said wall portions.

10. The combination as set forth in claim 9 wherein said chase and the terminal portion of said adapter are tubular in form, said tubular terminal portion serving as a journal on which said adapter turns for angular adjustment thereof and also forming a part of said adapter passage, whereby said utility is adapted to extend from said chase into the passage of said adapter through said tubular journal.

11. the combination as set forth in claim 7 wherein said fitting is in the form of an open box and is disposed with the box opening in register with an opening provided in one of said wall portions, and wherein said fitting is disposed between spaced studs formed as defined by claim 24 and is connected to the chase portions of both studs by adapters of the construction also defined by claim 24, said adapters extending from opposite ends of said fitting whereby pressure holding said fitting against said wall portion is applied substantially equally from opposite ends thereof.

12. A stud for a modular building system comprising a longitudinal tubular chase;
separate cleats disposed at opposite sides of said chase and detachably connected thereto;
a fitting; and
an adapter connecting said fitting to said chase between said cleats, said adapter supporting and positioning said fitting laterally and angularly with respect to said chase, said chase adapted to accommodate a utility such as wiring or the like and said adapter having a passage communicating with said chase and with said fitting and forming a way through which said utility is adapted to extend from said chase to said fitting.

13. A stud for a modular building system comprising:
a chase adapted to accommodate a utility such as wiring or the like and having separate upper and lower portions;
a fitting;
an adapter connecting said fitting to said chase, said adapter having a passage communicating with said chase and with said fitting and forming a way through which said utility is adapted to extend from the chase to the fitting; and
a pair of cleats disposed at opposite sides of said chase interfitting therewith, bridging the upper and lower portions thereof, and holding said portions assembled with said adapter, said adapter extending radially between the adjacent ends of said upper and lower chase portions and having a terminal portion of tubular form journaled in the upper and lower portions of said chase, said adapter having at least limited turning movement relative to said chase and including means for holding the same in a selected angularly adjusted position relative to the chase.

14. A stud adapted for use in a wall section of a modular building system between spaced parallel wall portions having confronting inner surfaces,
said stud having a longitudinal, medianly disposed tubular member forming a chase of electrical wiring or the like;
a receptacle box adapted to register with an opening in one of said wall portions; and
a transverse tubular element interconnecting and communicating with said chase and with said receptacle box defining a passage through which wiring is adapted to extend from said chase to said receptacle box,
said transverse tubular element extending laterally from said chase at a predetermined angle with respect thereto supporting said box and adapted to hold said receptacle box against the inner surface of one wall portion and in alignment with the opening in said one wall portion.

15. The combination as set forth in claim 14 including means permitting at least limited turning movement of said transverse tubular element about the axis of said longitudinal tubular member; and
separate means for holding said transverse tubular element interlocked with said longitudinal tubular member at said predetermined angle when said stud is fastened to said wall portions.

16. The combination as set forth in claim 15 wherein said stud is adapted particularly for use in a wall section having a foamed-in-place insulating core between said wall portions,
wherein said longitudinal tubular member has separate upper and lower portions arranged with adjacent ends thereof in spaced apart relation, and
wherein limited turning movement of said transverse tubular element is achieved by a tubular terminal on, communicating with and projecting in opposite directions from and transversely of said element,
the projecting portions of said terminal extending into and forming journals in he adjacent ends of the upper and lower portions of said tubular member,
said journals adapted to turn in said upper and lower portions but fitting sufficiently snugly to seal the space between the adjacent ends of said upper and lower portions against entry of foam material from said core into said chase and said passage.

17. The combination a set forth in claim 15 wherein:
said separate means comprises key and slot means on said transverse tubular element and at least one of the upper and lower portions of said tubular member,
said key and slot means adapted to interlock to hold said transverse tubular element in said predetermined angular position.

18. The combination as set forth in claim 17 wherein said stud has at least two radial cleats extending in opposite directions from said longitudinal tubular member and interconnecting the upper and lower portions of the latter, whereby to dispose said key and slot means when interengaged with each other to hoid said transverse tubular element in said predetermined angular position.

19. The combination as set forth in claim 16 wherein said stud has at least two radial cleats extending in opposite directions from said longitudinal tubular member and interconnecting the upper and lower portions of the latter, and wherein said transverse tubular element is detachably connected to at least one of said upper and lower portions, the interconnection of said cleats with said upper and lower portions and the detachable connection of said transverse tubular element with said upper and lower portions mutually coacting to position and hold said transverse tubular element with said receptacle box against said wall portion.

* * * * *